United States Patent [19]
Shiraki et al.
[11] Patent Number: 4,717,478
[45] Date of Patent: Jan. 5, 1988

[54] APPARATUS FOR IMPROVING CHARACTERISTICS OF SAND

[75] Inventors: Hisashi Shiraki; Toshio Nagahisa, both of Fuchu; Kiyonori Takeda, Fukuyama; Takeshi Harada, Fuchu, all of Japan

[73] Assignee: Kitagawa Iron Works Co., Ltd., Hiroshima, Japan

[21] Appl. No.: 873,415

[22] Filed: Jun. 12, 1986

[30] Foreign Application Priority Data

Jun. 20, 1985 [JP] Japan ................................ 60-135326
Feb. 19, 1986 [JP] Japan ................................ 61-23054

[51] Int. Cl.$^4$ ........................................ B01D 17/038
[52] U.S. Cl. ................................ 210/360.2; 210/363; 210/365; 210/367; 210/382
[58] Field of Search .................. 210/360.1, 360.2, 363, 210/364, 365, 367, 369, 377, 378, 379, 380.1, 372, 382

[56] References Cited

U.S. PATENT DOCUMENTS 2,432,766 12/1947 Kirby .................................. 210/363
3,636,468 1/1982 Ellis .................................... 210/363
4,417,980 11/1983 Baur et al. ........................... 210/383

*Primary Examiner*—Frank Sever
*Attorney, Agent, or Firm*—Frishauf, Holtz, Goodman & Woodward

[57] ABSTRACT

In apparatus for removing water and impurity components from sand, there are provided a rotary member having an opening at one end for charging and discharging sand and a filter for passing water. The rotary member is supported by a support and driven by a variable speed motor. Piston-cylinders or the like are provided for tilting the support. In a modified embodiment, two of the rotary bodies are juxtaposed with their openings faced each other. A peripheral wall of the rotary member is provided with a member of perforations for discharging water separated from sand.

22 Claims, 21 Drawing Figures

APPARATUS FOR IMPROVING CHARACTERISTICS OF SAND

BACKGROUND OF THE INVENTION

This invention relates to an apparatus for improving characteristics of sand, especially sea sand, utilized to prepare green concrete and concrete secondary products for the purpose of preventing degradation with time of the characteristics of concrete structure caused by salt hazard or the like and for improving the mechanical strength of concrete structures, and more particularly, an apparatus for obtaining sand containing a small quantity of impurities with a constant surface water content by removing mud and salt components contained in material sand by centrifugal separation together with surface water while washing with water.

In recent years, degradation of the quality of green concrete or concrete secondary products utilizing sea sand, which is caused by salt hazard, presents serious problems so that it became essential to remove salt when using sea sand.

Heretofore salt has been removed by sprinkling clean water on sand collected from sea bottom while the sand is carried by a transport ship (on-board water sprinkling method) or by sprinkling clean water onto sand piled up on land (land water sprinkling method).

With these prior art methods, however, since water is sprinkled onto a large quantity of sand, water is not sprinkled uniformly thus failing perfect salt removal. Conversely, for perfectly removing salt, it is indispensable to consume a larger quantity of clean water than actually necessary. Furthermore, in the case of the on-land sprinkling method, a large land area is necessary. Further, immediately after water sprinkling, the percentage of the surface water of sand is high so that such sand can not be used to prepare green concrete, thus requiring certain time for drying under sun light.

In a green concrete factory and a secondary product manufacturing factory, sand is stored in the outdoor where rain falls, whereby the surface water content of sand varies always. Accordingly, before using sand, it is necessary to measure the surface water content and correct the quantity of admixed water, which is troublesome and requires additional labor.

For this reason, after sprinkling a definite quantity of water onto sand, the sand is projected against a plate by using a rotary drum, a rotary table or the like (collision plate method).

With this method, however, separation of the surface water is effective only in a moment at which the sand collides upon the plate. This method is effective for coarse sand but not effective for fine sand, because the surface area of the sand is relatively large and the surface tension of the surface water is large. Though, the surface water is separated from the sand at an instant when the sand collides upon the collision plate, the separated water adheres again to sand, since the separated water scatters as a result of collision, thereby making it difficult to efficiently remove water from sand. This tendency becomes remarkable as the percentage of surface water increases. Furthermore, the quantity of the surface water after separation varies depending upon the quantity of the initial surface water so that the sand is crushed by the shock at the time of collision, thus changing the physical characteristics of the sand.

With regard to the desalting effect, the quantity of salt decreases only in proportion to the quantity of separated surface water, so that the desired object can not be attained.

SUMMARY OF THE INVENTION

Accordingly, it is an object of this invention to provide a novel apparatus for improving the characteristics of sand capable of desalting and adjusting water content in a short time.

According to this invention, there is provided apparatus for improving characteristics of sand comprising, a hollow rotary body having an opening at one end and means for filtering water content through a peripheral wall, means for rotatably supporting said rotary body, a variable speed motor supported by said supporting means for rotating the rotary body, and means for vertically tilting said supporting means.

DESCRIPTION OF THE PREFERRED EMBODIMENT

Figure 1:
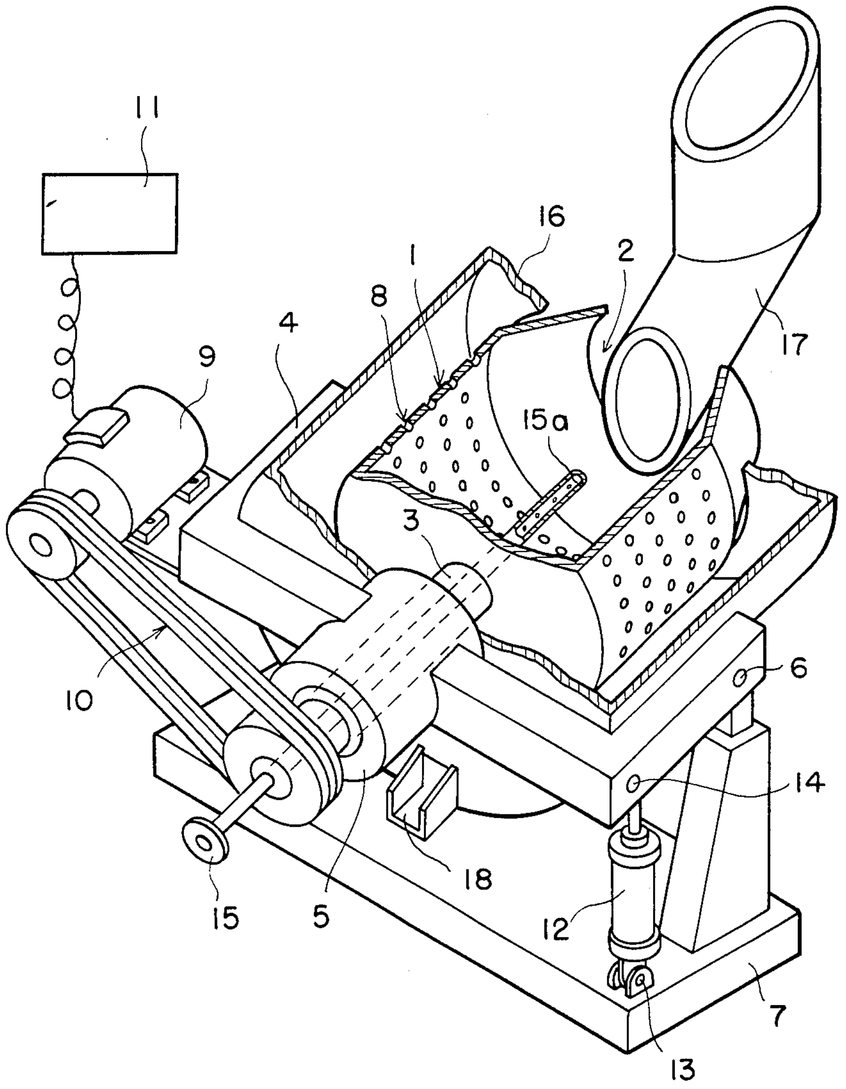
FIG. 1 is a perspective view, partly broken away, showing a preferred embodiment of apparatus for improving the characteristics of sand according to this invention.

The embodiment shown in FIG. 1 comprises a cylindrical rotary body or drum rotatably journalled by a bearing arm 4, a variable speed motor 9 for driving the rotary body 1, and an air cylinder 12 for tilting bearing arm 4 together with the rotary body 1.

An opening 2 is provided for one end of the cylindrical rotary body 1 for receiving and discharging sand, and a driving shaft 3 is provided for the other end. A plurality of discharge openings 8 are formed through the peripheral wall of the rotary body 1 for discharging water and liquid separated from sand admitted into the rotary body 1.

The bearing arm 4 carries a bearing 5 for rotatably supporting the rotary body 1 and a collection pan 16 for collecting water and liquid component discharged from discharge openings 8, the collection pan being provided with a discharge chute 18 at its lower end. The collection pan 16 is supported by a base 7 to be tiltable in the vertical direction about a pair of pivot pins 6.

The variable speed motor 9 is secured to the bearing arm 4 and disposed to drive the rotary body 1 through an endless belt 10. The speed of the motor 9 can be controlled to any value by a speed controller 11.

The lower end of the air cylinder 12 is supported by the base 7 through a pivot pin 13, while the upper end thereof is connected to the bearing arm 4 through a pivot pin 14, whereby contruction and extension of the piston rod of the air cylinder 12 causes tilting or swinging of the rotary body 1 together with the bearing arm 4.

The drive shaft 3 of the rotary body 1 is hollow for rotatably receiving a pipe 15 for supplying washing or rinsing liquid to the inside of the rotary body 1 from a source of liquid, not shown, so as to eject liquid against the inner peripheral surface of the rotary body 1 through a plurality of ejection openings 15*a*.

Supply of sand to the inside of the rotary body 1 is effected with a chute 17 having an end movable into the opening 2.

In operation, while rotating the rotary body 1 at a low speed, a certain quantity of sand having surface water containing salt and mud components is supplied into the rotary body 1 through chute 17. Then, the speed of the variable speed motor 9 is gradually increased to drive the rotary body 1 at a high speed. Then, by the action of centrifugal force, the surface water is separated from the admitted sand and the removed surface water is discharged out of the rotary body 1 through discharge openings 8.

After elapse of a predetermined time, a predetermined quantity of the rinsing liquid is introduced into the rotary body 1 through the supply pipe 15 to be sprinkled onto the sand for washing the same. The rinsing liquid is also separated from sand by centrifugal force and discharged to the outside through discharge openings 8, thus completing the separation step.

The surface water and the rinsing water separated from the sand flow out through discharge openings 8 and then collected by the collection pan 16. Finally, they are discharged to the outside of the apparatus through the discharge chute 18. Then, the air cylinder 12 is operated to the original state for restoring the rotary body 1 which has been tilted to the original position, thus completing one cycle of operation.

As above described, since the number of revolutions of the rotary body 1 is gradually increased starting from the time of sand supply, the sand is urged against the inner wall of the rotary body 1 by centrifugal force while being uniformly dispersed on the inner surface of the rotary body 1, and the rotary body 1 can be rotated smoothly without generating abnormal vibrations caused by unbalance.

After improving the characteristics of the sand by removing surface water containing salt and mud components for a predetermined interval, rinsing liquid is ejected upon the cleaned sand for continuously rinsing the same. Consequently, it is possible to obtain, in a short time and with a small quantity of the rinsing liquid, high quality sand containing water of definite quantity and not containing impurities.

It is possible to obtain sand having characteristics commensurable with the field of use thereof by increasing or decreasing the quantity of the rinsing liquid, or interrupting supply thereof, or using clean water as the rinsing liquid or incorporating chemical agents depending upon the initial characteristics of the sand.

Further, since water and impurity components are separated by centrifugal force, the degree of crushing the sand is small, thus preventing secondary troubles.

Although, in the foregoing embodiment, the rotary shaft 3 was supported by the bearing arm 4, where size of the apparatus is large, so-called both ends supporting mechanism may be used in which the outer periphery of the rotary body 1 is supported by rollers or the like. Further, instead of providing the rinsing liquid supply pipe 15 to extend through the rotary shaft 3, the pipe 15 can be provided for the chute 17.

Figure 2:
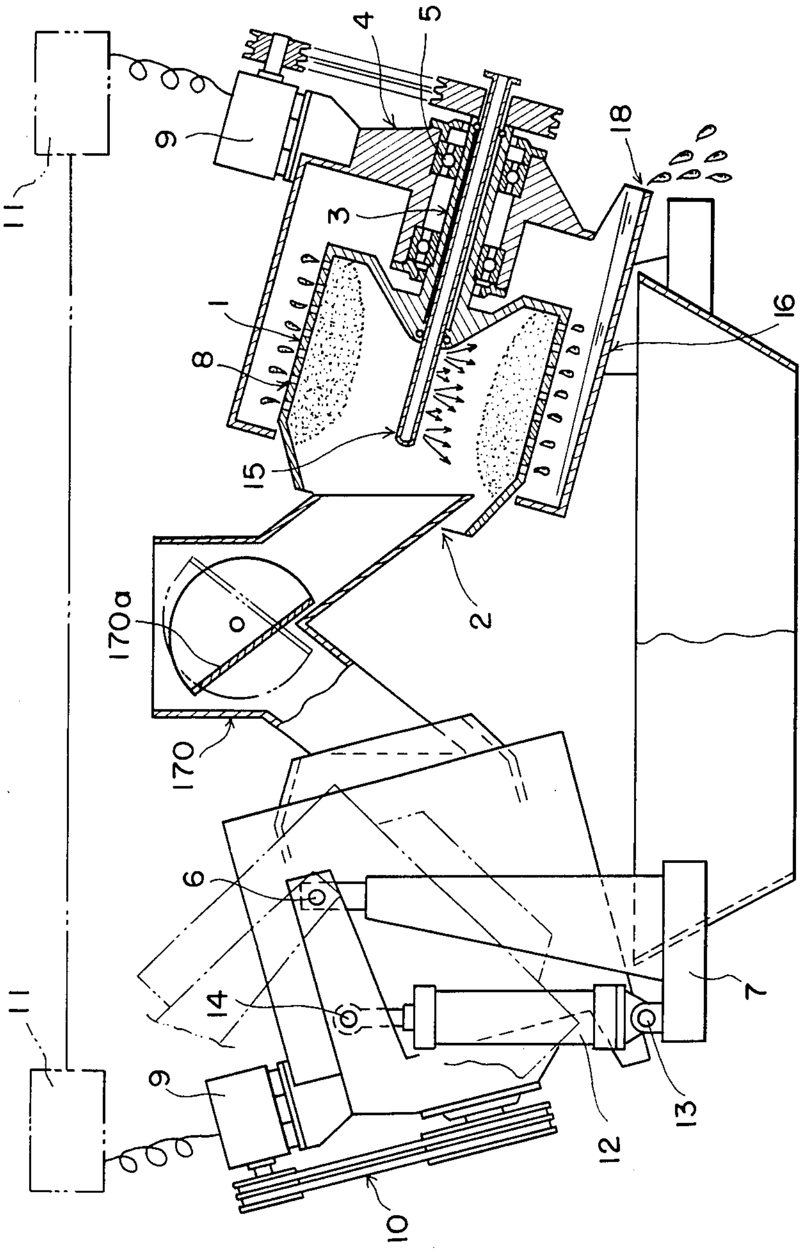
FIG. 2 is a side view, partly in section, showing another embodiment of this invention.

FIG. 2 shows a modification in which two juxtaposed apparatuses are used. As shown, a bifurcated chute 170 is provided at the center thereof and openings 2 of respective apparatus are disposed in an opposed relation.

The directions of supply of the chute 170 are alternatedly switched by a switching plate 170*a* so as to alternatedly supply sand to two rotary bodies 1.

With this construction, it is not only possible to speed up the operation for improving the characteristics of sand, but also to begin to decelerate one rotary body 1 for commencing a discharge step while to accelerate the other rotary body 1 for commencing a separation step, thereby enabling power save running by regenerating the energy of a decelerating rotary body through the motor 11 and by supplying regenerated electric power to another motor 11 under acceleration.

Figure 3:
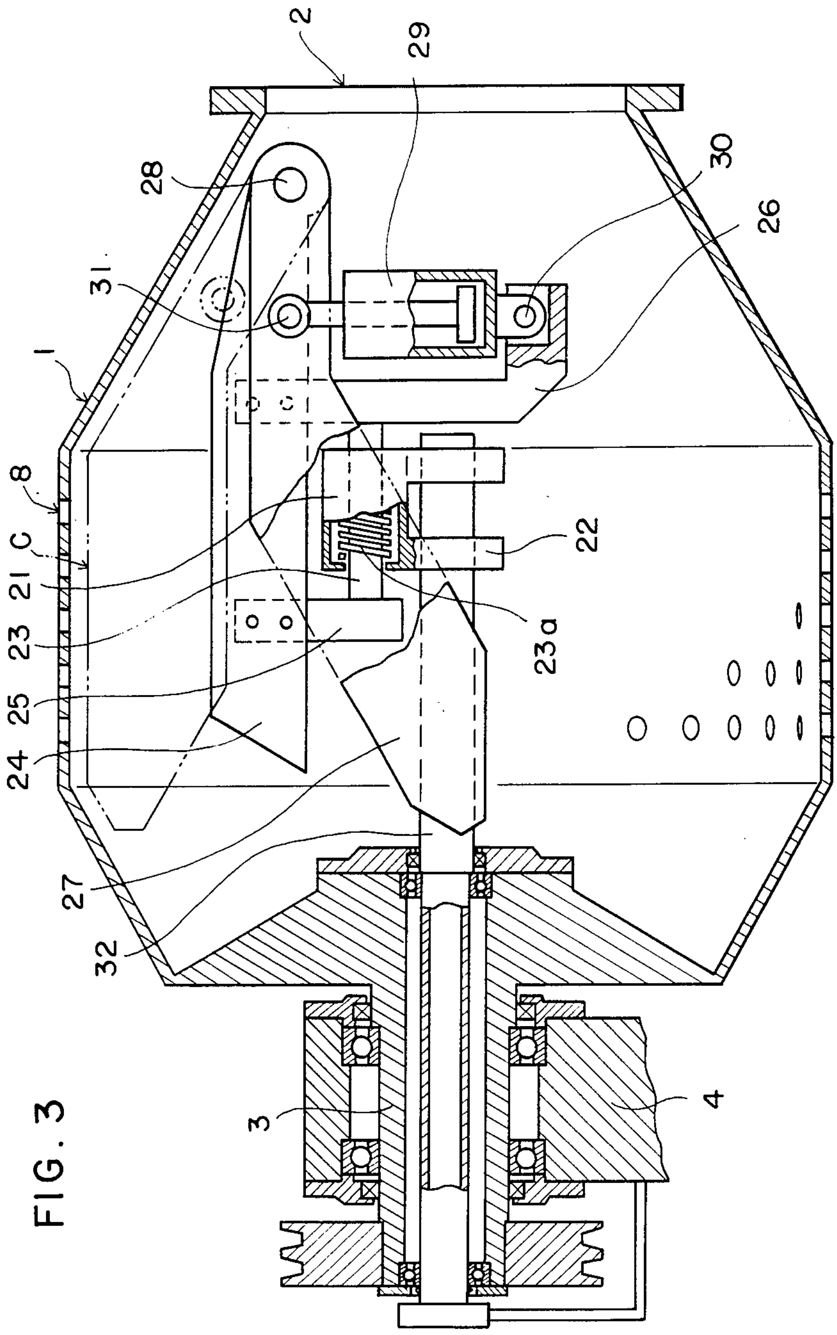
FIG. 3 is a sectional view showing still another embodiment of this invention.
Figure 4:
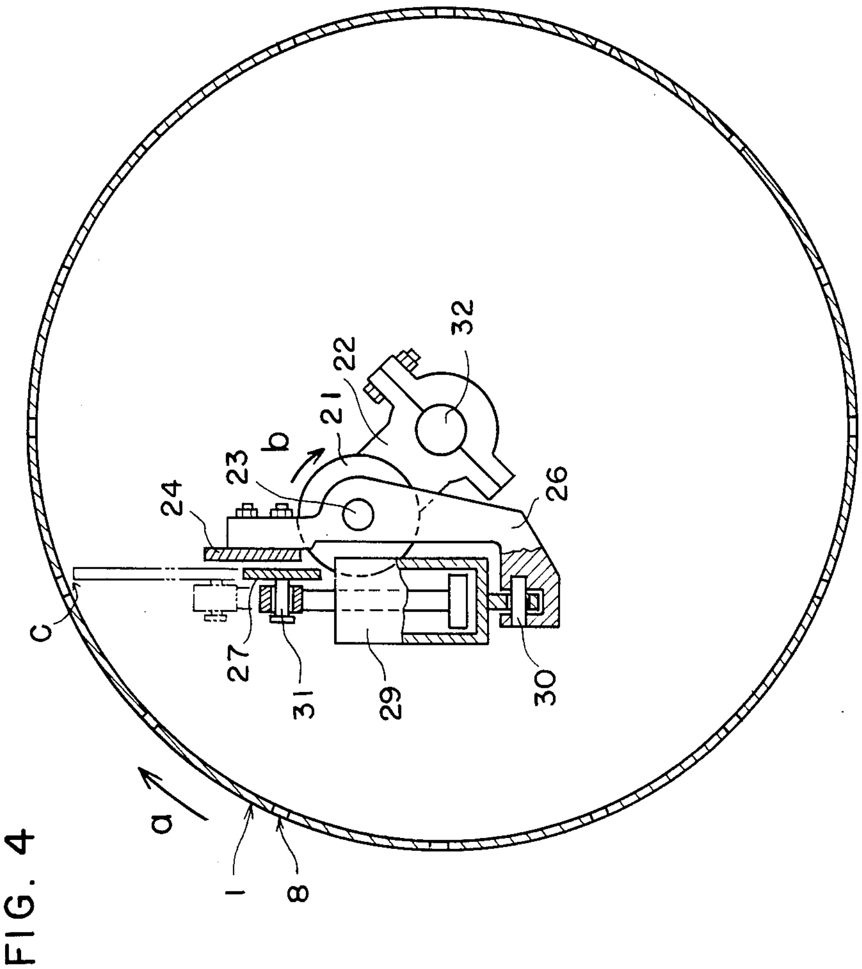
FIG. 4 is a cross-sectional view of a portion of the embodiment shown in FIG. 3.

FIGS. 3 and 4 show another embodiment of this invention in which instead of using the rinsing liquid supply pipe 15 shown in FIG. 1, a stationary shaft 32 is provided through the rotatable shaft 3 of the rotary body 1 to be rotatable relative thereto and the outer end of the stationary shaft 32 is secured to the bearing frame 4 so as to prevent rotation of the stationary shaft 32 even when the rotary body 1 rotates.

A casing 22 of a shock alleviating device 21 is secured to a portion of the stationary shaft 32 projecting into the rotary body 1. A shaft 23 parallel with the stationary shaft 32 extends through the shock alleviating device 21 to be rotatable relatively.

Arms 25 and 26 are secured to portions of the shaft 23 extending to the outside of the casing 22. Both arms 25 and 26 support a fixed plate 24 spaced from the inner periphery of the rotary body 1 by gaps necessary to accomodate the sand.

Normally, the shaft 23 occupies a position shown in FIG. 4, but, as the rotary body 1 starts to rotate in the direction of arrow a shown in FIG. 4 and as an urging force is applied against the plate 24 in the direction of arrow b shown in FIG. 4 by the introduced sand, the shaft 23 rotates against the force of a spring 23*a*. Upon removal of the urging force, the shaft 23 is returned to a predetermined position by the reactive force of the spring 23*a*.

One end of a movable plate 27 is rotably supported by a pivot shaft 28 at one end of the fixed plate 24 near the opening 2. A piston rod of a fluid pressure cylinder 29 pivoted to the arm 26 through a pivot pin 30 is connected to the movable plate 27 through a pivot pin 31 so that the movable plate 27 can swing about the pivot shaft 28. One side of the movable plate 27 facing the rotary body 1 is shaped to be commensurate with the inner contour of the rotary body 1 so that at a position c at which the movable plate 27 moved closed to the inner surface of the rotary body 1, the gap between the rotary body 1 and the movable plate 27 becomes minimum and constant.

The fluid pressure cylinder 29 is communicated with an oil pressure or air pressure converting apparatus, not shown, on the outside of the rotary body 1 through a pipe, not shown, and a hollow passage in the stationary shaft 32. Also the rinsing liquid is admitted through the passage in the stationary shaft 32 to be ejected through perforations provided for the stationary shaft 32.

Although, in the foregoing embodiment, the movable plate 27 is pivotally supported by the stationary plate 24 to be swingable, by providing a plurality of moving means or a lineally shifting guide, the movable plate 29 can reciprocate toward and away from the inner surface of the rotary body 1 while being maintained in parallel with the rotary shaft 32.

In operation, the rotary body 1 is inclined upwardly so as to direct the opening 2 upwardly with a predetermined angle. Then, the rotary body 1 is rotated at such speed that the sand will adhere to the inner surface of the rotary body 1 by centrifugal force and the sand having surface water containing salt and mud components is continuously supplied into the rotary body 1 by means of a vibrating feeder, a screw conveyor or the like, not shown. The thickness of the sand thus supplied is not constant in both the peripheral direction and the axial direction of the rotary body 1 so that the surface of the sand is irregular. However, by the scratching action of the stationary plate 24, the thickness of the sand layer would be made uniform all around the periphery. As the stationary plate 24 contacts with the sand layer, the resistance to rotation of the rotary body 1 increases, thus increasing the current flowing through the variable speed motor 9. When this current exceeds a predetermined value, a current detecting device, not shown, stops the sand feeder, thus maintaining constant the quantity of sand supplied in one operation.

After making constant the thickness of the sand layer, the speed of the variable speed motor 9 is increased to a level for separating water from sand by centrifugal force.

Upon completion of the centrifugal separation, the front end of the rotary body 1 is inclined downwardly and the speed of the variable speed motor 9 is gradually decreased so as to discharge the dehydrated sand. The sand adhered to the inner surface of the rotary body 1 can be scratched off by advancing the movably plate 27 close to the inner surface of the rotary body 1 by actuating the fluid pressure cylinder 29.

After completion of the discharge, the rotary body 1 which has been rotated about an inclined axis is brought back to its waiting position and the movablè plate 27 is also restored to the original position, thus completing one cycle of the operation.

With this modification, since the thickness of the sand layer in the rotary body 1, can be made uniform by the stationary plate 24, abnormal vibration caused by the unbalance of the rotary body 1 can be prevented, thus ensuring smooth rotation thereof without no vibration.

Discharge of the sand can be made in a short time by scratching away the sand remaining in the rotary body 1 by means of the movable plate 27. Further, with the provision of the shock alleviating device 21 acting in the direction of rotation of the rotary body 1 for the stationary plate 24 and the movable plate 27, the shock created when these plates 24, 27 engage sand can be absorbed, thus preventing damage to the apparatus.

It is also possible to know the quantity of sand supplied into the rotary body 1 by detecting the amount of movement of the movable plate 27 based on the current value flowing through the variable speed motor 9 and the variation of the quantity of oil of the oil or air pressure converting device, not shown.

Figure 5:
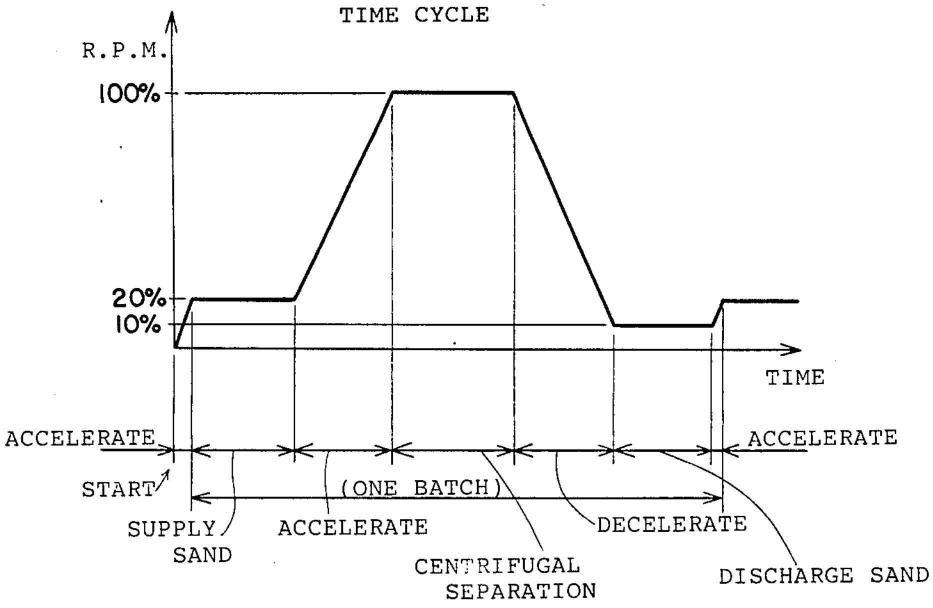
FIGS. 5 and 6 are timing charts each showing the operating cycle of the apparatus according to this invention.

A preferable treating pattern for automatically running the apparatus shown in FIGS. 3 and 4 is shown in FIG. 5. That is;

STEP 1

When the speed of the rotary body 1 reaches to about 20% of the normal speed necessary for centrifugal separation, a signal is sent to sand feed means, not shown, in the form of a belt conveyor, vibration feeder, screw conveyor, etc. to begin supply of the sand.

STEP 2

When the sand is supplied to the level of the stationary plate 24 installed in the rotary body 1 so that the whole length of the stationary plate 24 comes to contact with the sand, the current values of the motor 9 reaches a peak to send a stop signal to the sand feeding signal, thereby stopping supply of the sand.

STEP 3

When the rotational speed reaches 100%, the centrifugal separation is effected over a predetermined interval.

STEP 4

Deceleration is started and the axis of the rotary body 1 is inclined and when the speed decreases to 10% of the normal speed, the movable plate 27 is moved upwardly to scratch away the sand so as to discharge the treated sand.

The rotational speed at the time of treating sand is a limit value below which the sand is urged against the inner surface of the rotary body 1 by centrifugal force so as to rotate together with the rotary body 1, while the rotational is higher than that of discharge for the purpose of accurately holding the admitted sand and for the purpose of preventing local deposition of the sand, thus preventing unbalance.

When the motor current reaches a peak, the sand uniformly distributes on the inner surface of the rotary body 1. After stopping supply of sand, as the speed of the rotary body 1 increases the sand would be densely urged against the inner surface of the rotary body 1 thus creating a gap between the stationary plate 24 and the surface of the sand layer. As a consequent, continuous contact between them can be prevented thus saving power.

As above described, since the quantity of sand admitted can be detected by detecting the motor current and other steps can be automatically controlled by a timer, the centrifugal separation operation can be automated.

Figure 6:
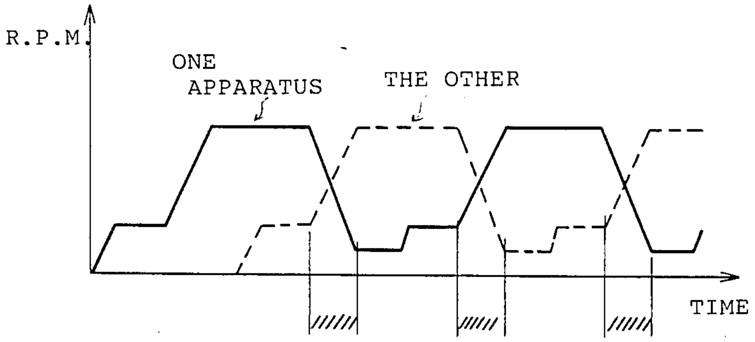

FIG. 6 shows a conveyance pattern when two apparatuses are juxtaposed as shown in FIG. 2. By using a time cycle in which, while one of the apparatus is being decelerated, the other is decelerated, the deceleration energy of one apparatus can be used as the accelerating energy of the other thus saving running energy.

Figure 7:
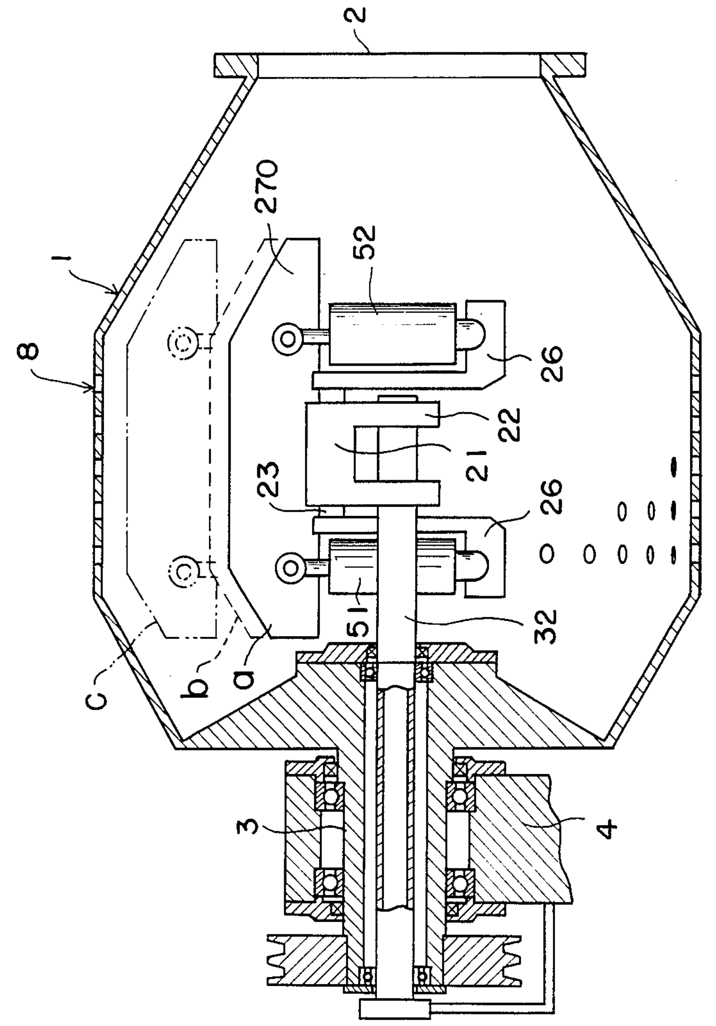
FIG. 7 is a longitudinal sectional view showing yet another embodiment of this invention.
Figure 8:
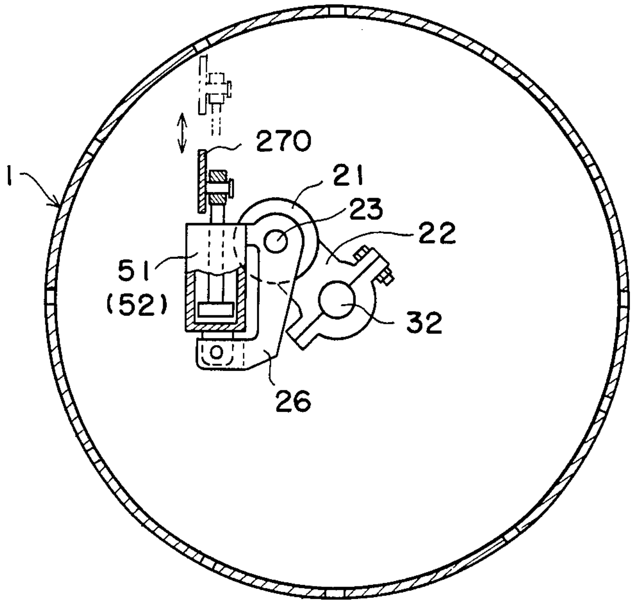
FIG. 8 is a cross-sectional view of the embodiment shown in FIG. 7.

FIGS. 7 and 8 show still another embodiment of this invention in which the stationary plate 24 is eliminated and only a movable plate 270 is provided.

By radially reciprocating the movable plate 270 toward and away from the inner surface of the rotary body 1 by two synchronously driven fluid pressure cylinders 51 and 52, flattering of the sand layer at the time of supplying the sand and scratching off at the time of discharge can be made.

In this embodiment, the plate 270 engages projections of the sand layer at a position b and when a definite quantity of sand is detected by the motor current, the movable plate 270 is returned to a position a while at the same time supply of the sand is stopped after dropping the sand remaining in the chute, the plate 270 is projected again to position b for smoothing the surface of the sand layer. At the time of discharging treated sand, the plate 270 is advanced to position c for scratching off the remaining sand. In this manner, smoothing of the surface of the sand layer can be effected positively. By varying position b the quantity of the supplied sand can be varied.

Instead of using fluid pressure cylinders 51 and 52, motor operated cylinders can be used for moving the movable plate 270.

Figure 9:
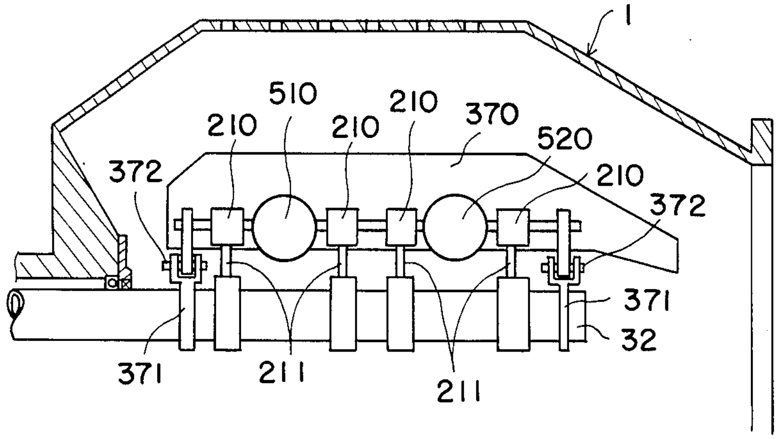
FIG. 9 is a longitudinal sectional view of still another embodiment of this invention.
Figure 10:
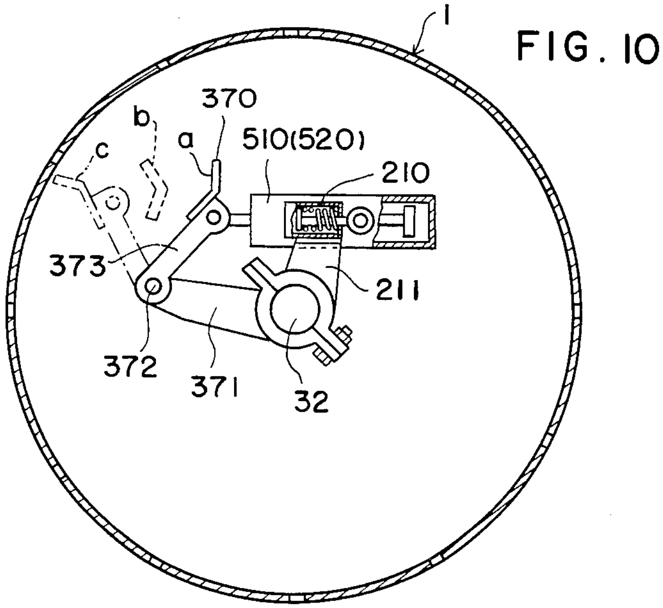
FIG. 10 is a cross-sectional view of the embodiment shown in FIG. 9.

FIGS. 9 and 10 show yet another embodiment of this invention which is constructed to reciprocate a movable plate 370 toward and away from the inner surface of the rotary body 1. The movable plate 370 is supported by a pair of swinging arms 373 which are pivotably connected to stationary arms 371 through pivot pins 372, the arms 371 being secured to the stationary shaft 32. The movable plate 370 is reciprocated toward and away from the inner surface of the rotary body 1 by fluid pressure cylinders 510 and 520 supported by shock alleviating devices 210 mounted on the upper ends of the stationary arms 211 also secured to the stationary shaft 32.

In this embodiment, the movable plate 370 is also selectively moved to positions a, b or c for attaining the same object as that of the embodiment shown in FIGS. 7 and 8.

Figure 11:
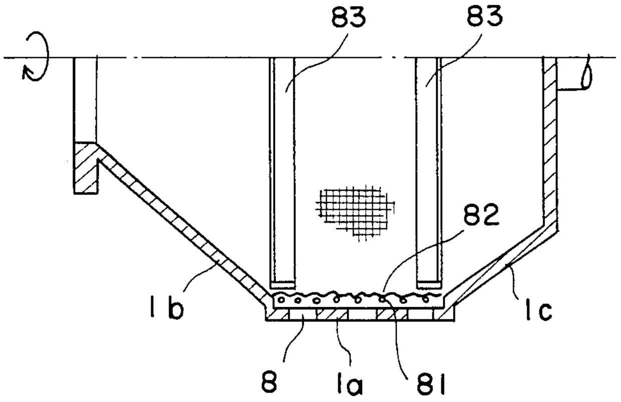
FIGS. 11 and 12 are partial views showing another examples of a rotary body.

FIG. 11 shows another example of the construction of the rotary body 1 utilized in this invention. More particularly, only the central portion 1*a* is made cylindrical, while the both end portions 1*b* and 1*c* are shaped as a frustum of cone. A plurality of separated water discharge openings 8 are provided through the peripheral wall of the cylindrical central portion 1*c*, and a net shaped strainer 82 is secured to the inside of the central portion 1*a* through a net-shaped spacer 81. The spacer 81 and the strainer 82 are removably mounted on the inner surface of the central portion 1*a* by a metal clamping band 83. The net-shaped spacer 81 prevents the strainer 82 from bulging outwardly through discharge openings 8 at the time of centrifugal separation and enhances flow of the separated water by defining a space between the strainer 82 and the inner surface of the rotary body 1.

Figure 12:
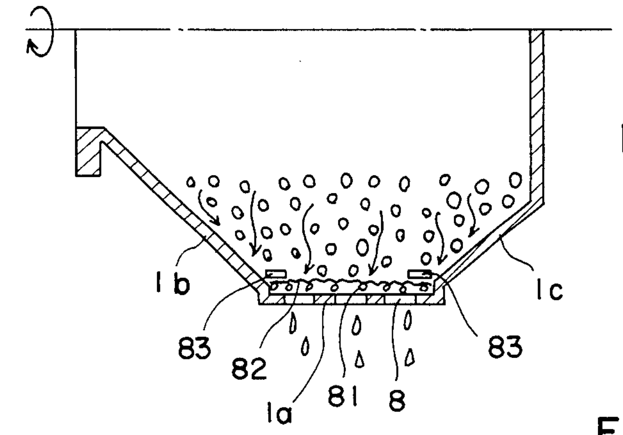

It is advantageous to use elastic material for the strainer 82 because at the time of the centrifugal dehydration, the meshes of the strainer 82 are enlarged, while when the centrifugal force is ceased the mesh size thereof is restored. At the restoring time, the sand caught by the strainer 82 is pushed back inwardly, thus preventing clogging of the meshes. With this construction, in the regions of the frustums of cones 1*b* and 1*c*, the particles of sand act as a type of a strainer as shown in FIG. 12 so that only the water separated thereby reaches the inner surface of the frustums of the cones 1*b* and 1*c* and then flows to the central portion 1*a* along the inclined surfaces thereof to be finally discharged to the outside through the strainer 82 and the opening 8. For this reason, it is not necessary to provide the discharge openings 8 at a high density over the entire periphery of the rotary body 1. This not only increases the strength of the rotary body 1, but also prevents splush of the separated water, and makes easy to remove clogged sand therefrom. Thus, by exchanging the strainer 82 the number of rinsing operations can be greatly reduced. It was found that the total area of the openings 8 of about 10% of the total inner area of the central portion 1*a* is sufficient.

Figure 14:
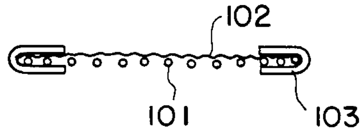
FIG. 14 is a sectional view taken along a line A—A in FIG. 13.
Figure 13:
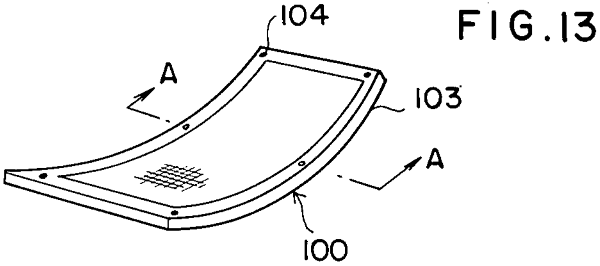
FIG. 13 is a perspective view showing an example of a strainer unit.

FIGS. 13 and 14 show another example of the strainer. In this embodiment, the strainer 100 is divided into several units 100 in the axial direction. This unit can be constituted by superposing a flat nylon cloth strainer 102 having a degree of air permeation of 20–100 cc/cm, or a stainless steel net of 100–200 meshes and a net shaped spacer 101 made of metal or resin and having 5–10 mm meshes. The periphery of the unit 100 is clamped by an U-shaped metal band 103. The section is secured to the inner surface of the central portion 1*a* by bolts passing through a plurality of openings formed through metal bands 103.

The strainer 102 can be constructed as an exchangeable unit where the lower half of the metal band 103 is made of an elastic material such as rubber and the strainer 102 is made to be exchangeable.

Figure 15:
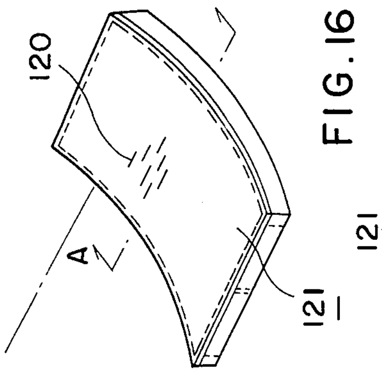
FIG. 15 is a perspective view showing another example of the strainer unit.
Figure 16:
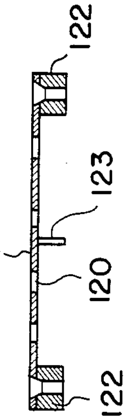
FIG. 16 is a sectional view taken along a line A—A in FIG. 15.
Figure 17:
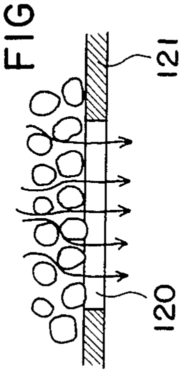
FIG. 17 is an enlarged view of the strainer unit shown in FIG. 15.

FIGS. 15 and 16 show another example of the strainer unit constituted by a plate 121 provided with many slits 120 over the entire surface thereof, spacers 122 secured to the lower side of the periphery thereof and a re-enforcing rib 123 secured to the lower side of the central portion thereof. With this construction, the particles of the sand pile one upon the other so that the sand constitutes a type of a strainer and the separated water flows through the interstices between the sand particles to the outside through slits 120.

Figure 18:
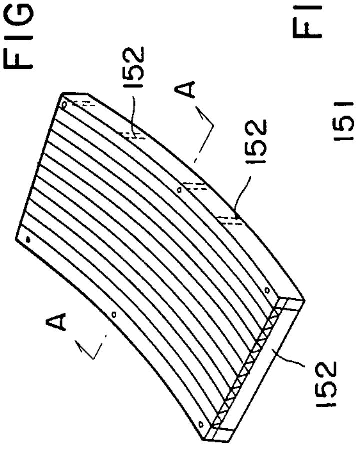
FIG. 18 is a perspective view showing another example of the strainer unit.
Figure 19:
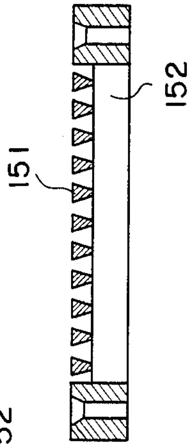
FIG. 19 is a sectional view taken along a line A—A in FIG. 18.

FIGS. 18 and 19 show still another example of the split strainer unit comprising wedge shaped members 151 juxtaposed with a spacing of about 0.1 mm, and transverse re-enforcing plates 152. Since the gap between the members 151 is narrower on the inner side than the outer side, not only clogging of the gaps by sand can be prevented but also back washing can be made readily.

In the strainer units shown in FIGS. 15 through 18, since the spacing between the cylindrical central portion 1*a* of the rotary body 1 and the strainers 121 and 151 can be ensured by the re-enforcing members 121 and 152, it is not necessary to use spacers.

Figure 20:
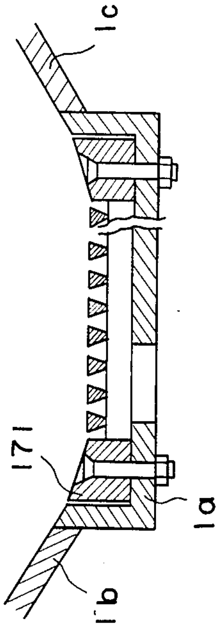
FIG. 20 is a sectional view showing still another example of the strainer unit.

FIG. 20 shows another construction of the strainer in which the inner diameter of the cylindrical portion 1*a* is made larger than that of conical portions 1*b* and 1*c*, and the upper surfaces of mounting members 171 are shaped to smoothly merge with the inclined inner surfaces of the conical portions 1*b* and 1*c*. This construction prevents stagnation of the separated water, thus rapidly discharging the same.

Figure 21:
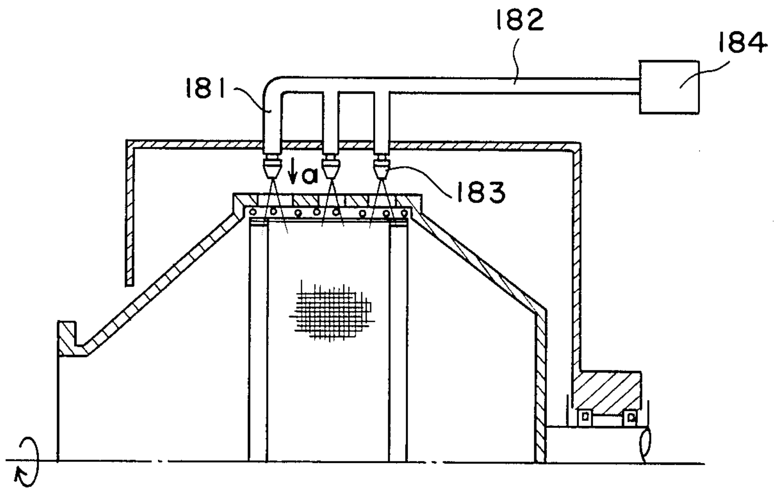
FIG. 21 is a vertical sectional view showing a strainer washing mechanism.

FIG. 21 shows an embodiment of this invention equipped with a device for washing the strainer of the type described above. The washing device comprises a plurality of branch pipes 181 branched from a main pipe 182, the number of the branch pipes 181 being equal to that of the discharge openings at the central portion of the rotary body 1. Nozzles 183 are provided for the ends of respective branch pipes 181. The main pipe 182 is connected to a high pressure water pump 184. After performing several centrifugal separation steps, and after discharging the cleaned sand, the pump 184 is started while the rotary body 1 is rotated at a low speed for ejecting high pressure water in the direction of arrow a to wash the strainer. Instead of using high pressure water, high pressure air can be used for cleaning.

When such washing or cleaning device is used, it is not necessary to remove and wash or exchange the strainer or strainer units. Since high pressure water or air is ejected from outside of the rotary body 1, it is easy to remove sand particles caught by the meshes of the strainer. Furthermore, since washing is done during a low speed rotation, washing can be made without being influenced by the centrifugal force created by sand caught by the strainer, thus enabling easy removal of the trapped sand. The sand remaining in the rotary body 1 after washing is not necessary to be discharged but such sand can be subjected to the centrifugal separation together with newly supplied sand. Thus, there is no loss of sand and it is not necessary to install any lost sand recovering apparatus.

As above described, with the apparatus for improving characteristics of sand according to this invention, desalting and water content adjustment can be sufficiently made within a short time. The stationary and/or movable plates provided in the rotary body make it possible to evenly distribute the supplied sand into the rotary body, thereby preventing abnormal vibration of the rotary body at the time of centrifugal separation. At the time of discharge, the movable plate is retracted to prevent deposition of the sand in the rotary body, thus decreasing the discharge time. When strainer is detachably mounted on the rotary body, its washing and exchanging can be made readily.

What is claimed is:

1. Apparatus for processing sand to improve the characteristics thereof comprising:
- means designed for removing impurities and water from sand quickly and uniformly including
  - a stationary support;
  - a hollow rotary body with walls formed concentrically around an axis extending between a closed end and an opposite open end with an opening therein sized to admit sand therethrough, and filtering means for passing water from the sand through a peripheral wall of the rotary body while retaining the sand;
  - mounting means for coupling said rotary body to said support for rotation around said axis;
  - means for forming a layer of sand on the inner periphery of said rotary body so as to make the sand layer thickness uniform;
  - means for supplying water, in a substantially uniform manner, to the sand of uniform thickness within the rotary body; and
  - means coupled to said support for rotating said rotary body at a variable speed high enough to apply a centrifugal force to the sand of sufficient magnitude to remove at least some of the water therefrom and to pass the removed water through said filtering means.

2. Apparatus for processing sand to improve the characteristics thereof comprising:
- means designed for removing water from sand quickly and uniformly including
  - a stationary support;
  - a hollow rotary body with walls formed concentrically around an axis extending between a closed end and an opposite open end with an opening therein sized to admit sand therethrough, and filtering means for passing water from the sand through a peripheral wall of the rotary body while retaining the sand;
  - mounting means for coupling said rotary body to said support for rotation around said axis;
  - means for forming a layer of sand on the inner periphery of said rotary body so as to make the sand layer thickness uniform; and
  - means coupled to said support for rotating said rotary body at a variable speed high enough to apply a centrifugal force to the sand of sufficient magnitude to remove at least some of the water therefrom and to pass the removed water through said filtering means.

3. The apparatus according to claim 1 or 2 wherein said filtering means comprises a plurality of perforations.

4. The apparatus according to claim 1 wherein a pair of said hollow rotary bodies are disposed with their openings facing each other, and said said introducing mean alternately supplies sand to said rotary bodies and includes a bifurcated chute provided with a switching plate.

5. The apparatus according to claim 1 or 2 further comprising a water collecting frame mounted on said support and surrounding said rotary body, said frame having a discharge opening at a lower side thereof.

6. The apparatus according to claim 1 or 2 wherein said rotary body comprises a hollow rotary shaft extending along said axis, said mounting means having a bearing journalling said hollow rotary shaft, and said water supplying means comprises a rinsing water supply pipe inserted into said rotary body through said hollow rotary shaft.

7. The apparatus according to claim 1 or 2 wherein said means for rotating the rotary body includes a drive shaft and a variable speed motor coupled to said drive shaft through an endless belt.

8. The apparatus according to claim 1 or 2 wherein said rotary body includes a hollow shaft, a stationary shaft extends through said hollow shaft into the interior of the rotary body, a stationary plate mounted on said stationary shaft within the rotary body, a shock alleviating device mounted between the stationary shaft and the stationary plate, a movable plate, and means for mounting said movable plate on said stationary plate to be movable toward and away from an inner surface of said rotary body.

9. The apparatus according to claim 1 or 2 wherein said rotary body includes a hollow rotary shaft, a stationary shaft extends through said hollow rotary shaft into the interior of the rotary body, a movable plate mounted on said stationary shaft by a shock alleviating device, and means for reciprocating said movable plate toward and away from an inner surface of said rotary body.

10. The apparatus according to claim 1 or 2 wherein a central portion of said rotary body along said axis and between the ends of the rotary body is cylindrical, a pair of cone shaped members are connected to and extend axially from said central portion, and said filtering means comprises a strainer provided in said cylindrical portion.

11. apparatus according to claim 9 wherein a spacer is interposed between said strainer and an inner surface of said cylindrical central portion of the rotary body.

12. The apparatus according to claim 10 wherein said strainer and said spacer are divided into a plurality of detachable units.

13. The apparatus according to claim 9 wherein said strainer comprises a plurality of plates each provided with slits, spaces are provided beneath said split plates to surround the same and re-enforcing ribs are provided beneath central portions of said split plates.

14. The apparatus according to claim 9 wherein said strainer comprises a plurality of wedge shaped members, spacers are provided beneath both sides of said strainer, and re-enforcing ribs are secured in the axial direction to support said strainer thereby constituting split units.

15. The apparatus according to claim 9 wherein an inner diameter of said central portion is larger than maximum diameters of said conical portions, and an inner surface of the mounting frame of said strainer smoothly merges with an inclined inner surface of said conical portion.

16. The apparatus according to claim 1 or 2 wherein said filtering means comprises a strainer provided through a peripheral wall of said rotary body, and further comprising a rinsing water ejecting nozzle mounted outside said rotary body, and means for ejecting rinsing water via said nozzle into said rotary body through said strainer, and a source of high pressure connected to said rinsing water ejecting means.

17. The apparatus according to claim 1 or 2, further comprising means for tilting the rotary body so as to move at least one of the ends of the rotary body vertically.

18. The apparatus according to claim 2 or 16 wherein said tilting means comprises fluid pressure cylinders.

19. The apparatus according to claim 1 or 2, wherein the rotating means comprises a variable speed motor.

20. The apparatus according to claim 1 or 2, wherein the means for forming the layer of sand to have a uniform thickness comprises leveling means mounted inside said rotary body and having an edge extending at a uniform distance from the inner surface of the rotary body.

21. The apparatus according to claim 1 or 2, wherein the water supplying means comprises a rinsing water supply pipe extending along said axis and penetrating into the interior of said rotary body; and wherein said means for forming a layer of sand having a uniform thickness comprises a plate, and means for mounting the plate to said rinsing water supply pipe to move the movable plate toward and away from the inner surface of said rotary body.

22. The apparatus according to claim 21, wherein said movable plate includes an edge spaced at a uniform distance from the inner surface of said rotary body when the movable plate is moved toward said inner surface of the rotary body.

* * * * *